United States Patent [19]

Buote

[11] Patent Number: 4,586,151
[45] Date of Patent: Apr. 29, 1986

[54] SELF-CONFIGURING COMPUTERIZED ROBOT CONTROL SYSTEM

[75] Inventor: William J. Buote, Natick, Mass.

[73] Assignee: Zymark Corporation, Hopkinton, Mass.

[21] Appl. No.: 528,934

[22] Filed: Sep. 2, 1983

[51] Int. Cl.$^4$ .................................................. G06F 9/00
[52] U.S. Cl. .................................... 364/513; 364/131; 901/2; 901/8
[58] Field of Search ........................ 901/2–8, 901/30–38, 40–45, 50; 29/701; 218/568, 576; 364/131, 132, 134, 135, 138, 139, 140, 167, 171, 474, 513, 191, 192, 193

[56] References Cited

U.S. PATENT DOCUMENTS

| | | | |
|---|---|---|---|
| 4,152,765 | 5/1979 | Weber | 364/191 X |
| 4,187,051 | 2/1980 | Kirsch et al. | 901/9 X |
| 4,253,148 | 2/1981 | Johnson et al. | 364/200 |
| 4,262,336 | 4/1981 | Pritchard | 364/132 X |
| 4,281,379 | 7/1981 | Austin | 364/132 |
| 4,306,803 | 12/1981 | Donohue et al. | 364/131 X |
| 4,328,550 | 5/1982 | Weber | 364/192 X |
| 4,348,623 | 9/1982 | Kobayashi et al. | 364/513 X |

*Primary Examiner*—Jerry Smith
*Assistant Examiner*—Allen MacDonald
*Attorney, Agent, or Firm*—Andrew F. Kehoe

[57] ABSTRACT

Apparatus constructed such that it may control various other equipment for the performance of various work tasks, even other equipment yet to be designed for work tasks yet to be designed. The apparatus comprises a central computer control means comprising (1) a dictionary storage means for tagging and storing command-specific parameters for a specific work tasks and that specific robot module to which each of the parameters belongs and (2) sequencing means to schedule said work-tasks for a plurality of said modules. The module also can be activated for the task without use of the sequencing means, e.g. by having the module request one of its own dictionary entries.

13 Claims, 9 Drawing Figures

SELF-CONFIGURING COMPUTERIZED ROBOT CONTROL SYSTEM

RELATED APPLICATION

A promising self-configuring robotic control system is disclosed in a U.S. patent application Ser. No. 472,642 filed on Mar. 7, 1983 by Hutchins, Buote and Finn. That application relates to a robot-control means which does include the ability to incorporate a number of independent tools or operating systems including operating systems not defined before implementation of the robot control means by the pruchaser thereof. The invention disclosed herein may be viewed, in part, as an improvement in the process of operating a self-configuring robotic system of the type earlier disclosed in Ser. No. 472,642.

BACKGROUND OF THE INVENTION

This invention relates to the efficient automatic control apparatus capable of scheduling and controlling a number of independent machines. It relates particularly to the efficient user-friendly control of a number of work stations by a robot means.

In the provision of some computer-operated apparatus, e.g. robots, it is desirable to provide a variety of operations in various sequences and to do so making efficient use of a central computer-control apparatus. Moreover, it has been desirable to provide computer-control systems that would be capable of controlling new work stations, even new apparatus for performing work tasks which are not conceived at the time of the original installation, with a minimum of waste of resources in reconfiguring and learning the modified or expanded system. This type of problem is best seen with respect to a computerized robot control. For example in a laboratory system wherein a person may use the robot to carry out a filtration operation with one set of equipment and a mixing procedure with another set of equipment, it may be desirable, two years after the purchase of the system, to add a step for carrying out centrifuging and, a packaging operation. Moreover, it may sometimes be desirable to carry out the packaging operation before the mixing, or to have a post-packaging centrifuation procedure. Available computer-control apparatus for robots to efficiently achieve the various processes including different sequences, and even process steps relating to equipment only to be developed in the future, is not available.

Indeed, advanced robot-control approaches being contemplated at present seem to be divided into two-classes: One of these is a so-called "teach-pendant" procedure which essentially does away with the need to utilize a computer programming language. Abstraction is largely eliminated. Any sequencing of operations is stored in the control system in a manner which limits its flexibility.

Another type of procedure is typified by those various program or programs which are completely defined and the use of robot-independent language. There is not concept of the use of a very simple, device-independent, sequencing language or use of such a language in a system featuring acceptance of yet-to-be-defined programs for operating yet-to-be defined-apparatus.

In many commerical operations, teaching a single conventional computer language to the operator, sometimes a new language for different modules, presents a major problem in economic assimilation of the robot apparatus into the plant or laboratory. The present inventor has set out to simplify the language problem while maintaining great flexibility in the operating capabilities of his control system.

SUMMARY OF THE INVENTION

It is a principle object of the present invention to provide a computer control system, particularly a control system for robots, which may be readily and efficiently used to control a plurality of work stations and tools, particularly work stations and tools which carry all of their own intelligence undefined at the time the system is placed into use by its purchaser.

Another object of the invention is to provide such computer control system which can be more effectively, easily, and efficiently utilized in selecting sequences of operations for different tools or work stations.

Another object of the invention is to provide a simple computer control means utilizing a non-complex computer language, one utilizing a "teach and name" concept and having no requirement that it describe requested work tasks in abstract terms.

Another object of the invention is to provide a decoding or dictionary means which comprises at least one part defined with respect to the entire computer system and another part defined only with respect to the intelligence-bearing work station, or module, which is to carry out the requested work task.

Other objects of the invention will be obvious to those skilled in the art on this reading of the subject application.

These above objects have been substantially achieved by utilizing a process whereby one operates a robot module; e.g. from a keyboard, with the computer system control means to generate its own command-specific parameters for a specific work task. In so doing, the module uses its own intelligence. The module code causes to be recorded in a temporary buffer memory of the computer system, all necessary parameters to reproduce the operation. When the operation, or "work task", is so defined in the system, the operator can elect to name it whatever he wishes to name it and transfer the parameters to the systems "dictionary". These parameters then become a major part of the definition of the "name". This part of the definition is "owned" by the module. Thus these parameters can only be interpreted and utilized with the aid of the intelligence, i.e. the code of the "owner" module. The dictionary entry also contains the identity of the module owner and, of course, the name by which it has been tagged.

A given module can be utilized to create a large number of dictionary entries and the systems can accommodate a large number of modules.

These dictionary names will usually be selected from normal operational language of the plant or laboratory. Therefore, taken together, these names form a simple, device-independent, yet subtle and powerful, computer language.

When one wished to run a "program" one simply enters the list of names representative of the list of functions that one wishes to be accomplished by the group of robot modules.

The control system looks up the names, now taken to be commands from the central processing unit, gives over to the appropriate module the information from the command-specific operating parameters of the dictionary entry. The module performs the action (utilizing its own module intelligence as to how the operation should be performed). It is to be noted particularly that the code of the central processing system, in the preferred systems of the invention, is not generally capable of carrying out the operation which it has directed to be performed in the way that the specific operation should be performed under any given set of circumstances.

The relatively simple language allows proper sequencing commands for tool operations such as a robot, manipulative processes carried out by manipulators of various types associated with the robot, and commands for other power and event control procedures associated with the apparatus. Since the language, used as taught herein, is independent of specific tools or devices, it can provide any sequence of operations of the various tools or devices.

The tag used in the Dictionary allows, the control system to access certain command specific parameters and that, specific work station, or tool, to which the procedure is to be directed by the system. What the control system can do with the command-specific parameters is to send them to the robot module.

Each tool or work station, can have a large number of procedures stored with appropriate distinct tags in the dictionary.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

DETAILED DESCRIPTION OF THE INVENTION

Figure 1:
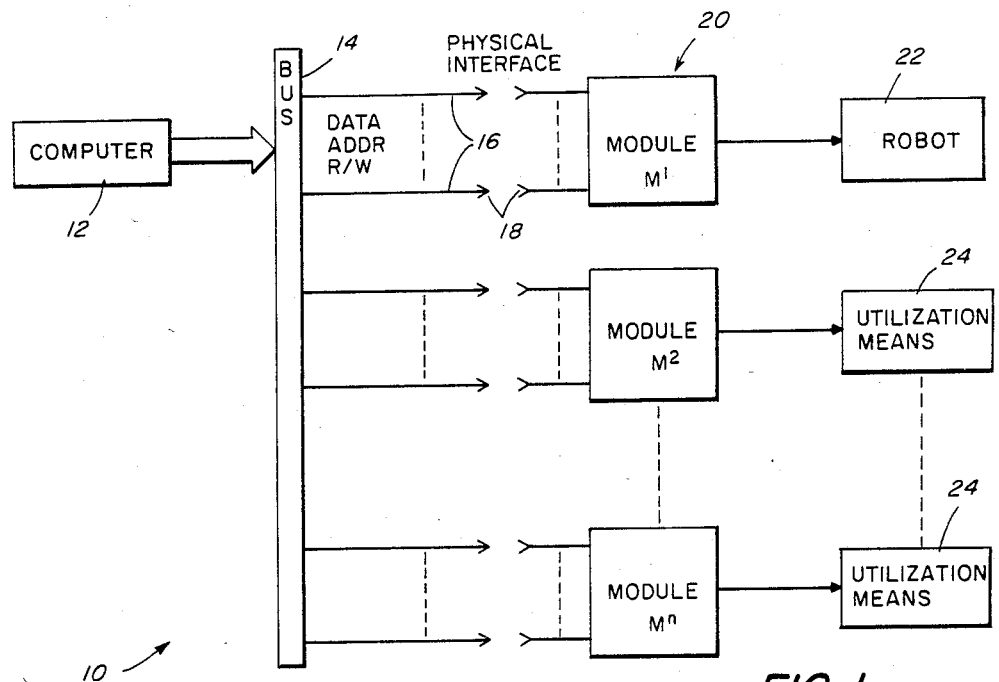
FIG. 1 is a block diagram of the self-configuring robotic system.
Figure 3:
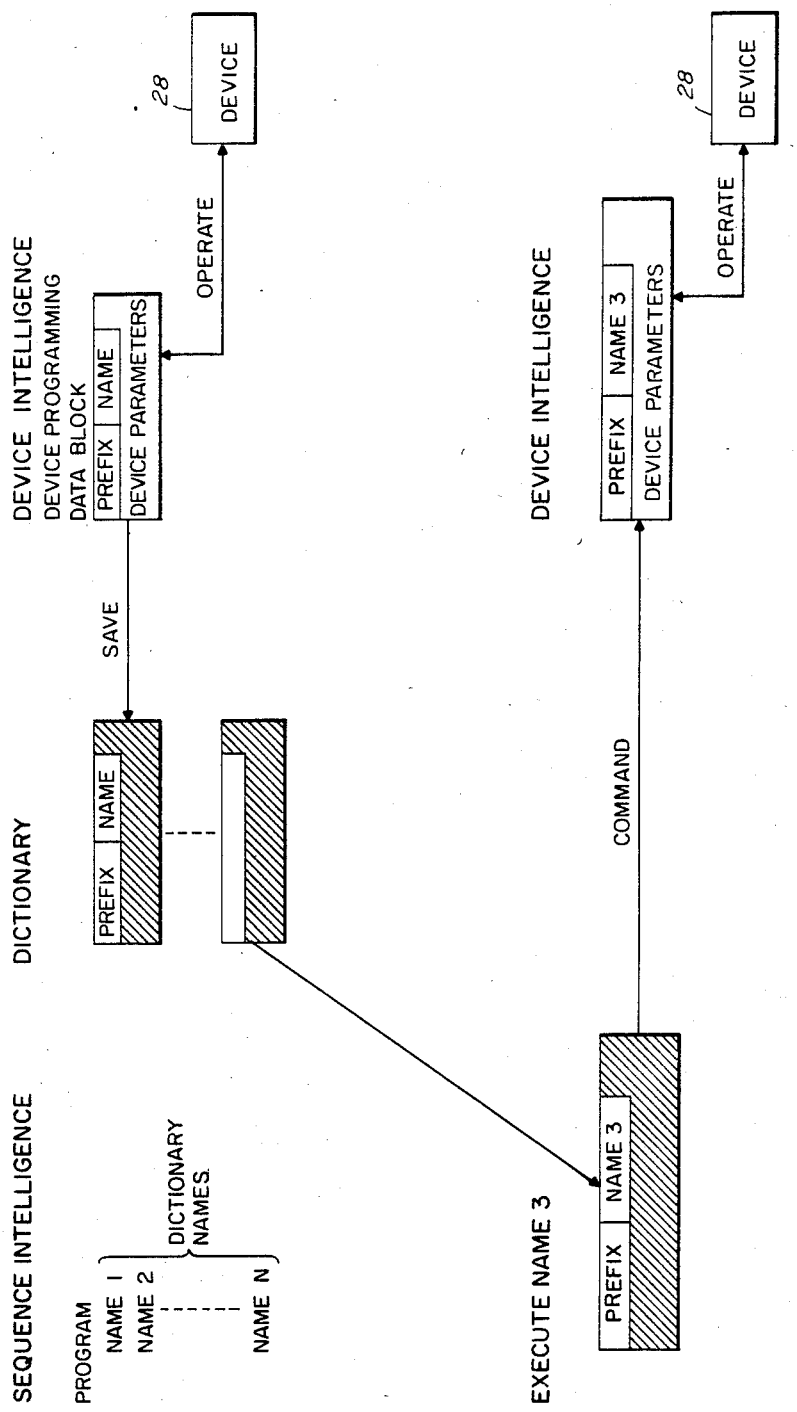
FIG. 3 is a data flow diagram illustrating the data flow paths in the self-configuring robotic system.

Turning now to FIGS. 1 and 3, there is shown in block diagram form a robotic system and indicated generally by the reference numeral 10. This system is a self-configuring robotic system of a type with which the present invention is advantageously utilized. The robotic system 10 utilizes a conventional computer 12 having an operating system containing at least a nucleus, a sequence reprogrammer and task support services. Computer bus 14 includes at least data, address and read/write lines 16 that are electrically connected through physically separable connections 18 to a module indicated generally by the reference numeral 20.

The structure of module 20 will be discussed below in connection with FIG. 2. For now, it is sufficient to note that module 20 is electrically connected to a robot 22. The term "robot", as used herein, means: "A reprogrammable, multifunction manipulator designed to move material, parts, tools, or specialized devices through variable programmed motions for the performance of a variety of tasks.". This is the definition for the term "robot" that has been adopted by The Robitics Institute of America.

As shown in FIG. 1, the robotic system of the present invention includes at least on other module ($M^2$) that is electrically connected to a utilization means 24. The utilization means 24 can comprise either another robot 22 or a means for performing a defined task. Expansion of the robotic system is provided for through the use of additional utilization means and associated modules, e.g. module ($M^n$).

Figure 2:
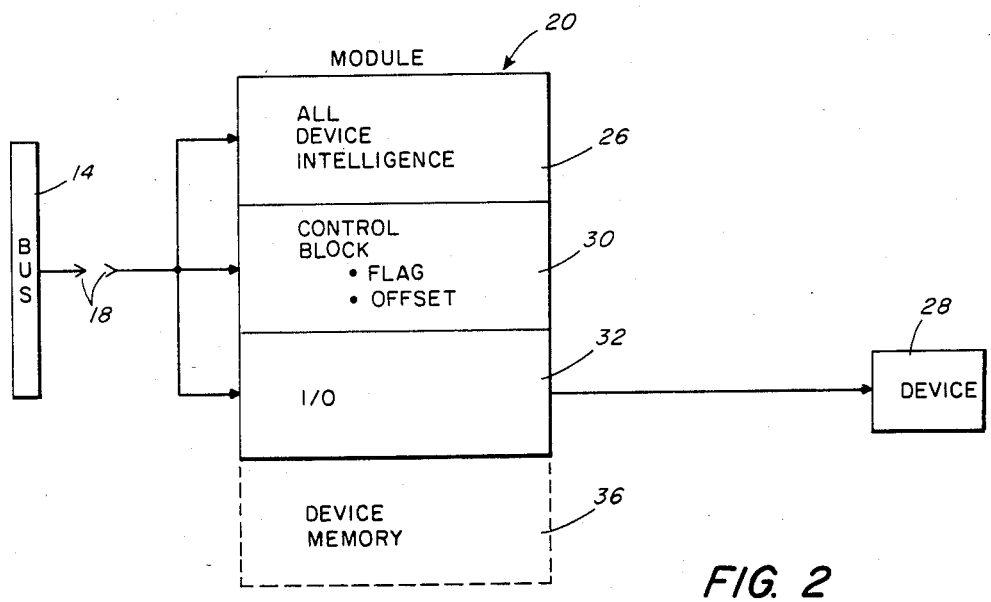
FIG. 2 is a block diagram showing the module of FIG. 1 in greater detail.

The detailed structure of modules 20 is illustrated in the block diagram of FIG. 2. Each module contains all of the device intelligence 26 for its associated device 28. Device 28 generaically represents the previously mentioned robot 22 and utilization means 24. The module 20 also contains a control block 30 having a control block flag and a starting offset for computer 12 and an appropriate input/output interface 32 between the computer 12 and the device 28. If desired, the module 20 can also include device memory 36 represented by the dashed lines in FIG. 2.

The device intelligence 26 contained within module 20 can be stored in a variety of conventional forms. For example, the device intelligence can be stored in read-only memories (ROM'S).

It will be appreciated from the preceding description of the hardward structure of the robotic system that each device 28, whether it be a robot 22 or a utilization means 24, has an associated module 20 that contains all of the intelligence for the particular device. The associated module also provides a control block flag and starting offset for the computer and an appropriate I/O interface between the computer and device 28. Each module is electrically connected to the common computer bus 14 through a plurality of the separable electrical connections 18. It should be noted that all of the device intelligence is on the device side of the physical interface formed by the separable electrical connections 18.

Thus, in configuring or reconfiguring a system, it is possible to simply plug the appropriate device module 20 into the computer bus 14 because of the module contains all of the corresponding device intelligence, the appropriate control block information for computer 12 and the input/output interface between the device and the computer. This particular system architecture greatly simplifies the implementation and configuration of a specific robotic system to accommodate the needs of an end user. Since the device and its associated module constitute a separable unit, various task-performing devices can be attached to or removed from the robotic system 10 simply by plugging in or removing the appropriate module 20.

Turning now to FIG. 3, there is shown a data flow diagram for the robotic system of the present invention. Referring to the upper righthand corner of FIG. 3, device 28 is initially programmed using the device intelligence to produce a data block containing a device identifying prefix, data block name selected by the "End User" and device parameters for the specific device. The data block is saved in a dictionary that contains a plurality of data blocks each with prefix and name and associated device parameters. The sequence intelligence for controlling the sequential operation of the devices is contained in a program for computer 12. The program, which has the dictionary names, defines the sequence in which the data blocks are obtained from the dictionary and executed. The sequence intelligence and the dictionary need not be able to decode the device parameters, as indicated by the shaded sections of the data blocks under sequence intelligence and dictionary in FIG. 3. By way of illustration, FIG. 3 depicts the data flow for execution of Name 3 from the dictionary. A command is issued to the device intelligence to pass the "Name 3" device parameters to the prefix identified device 28 causing operation of the device in accordance with the sotred device parameters.

Figure 4:
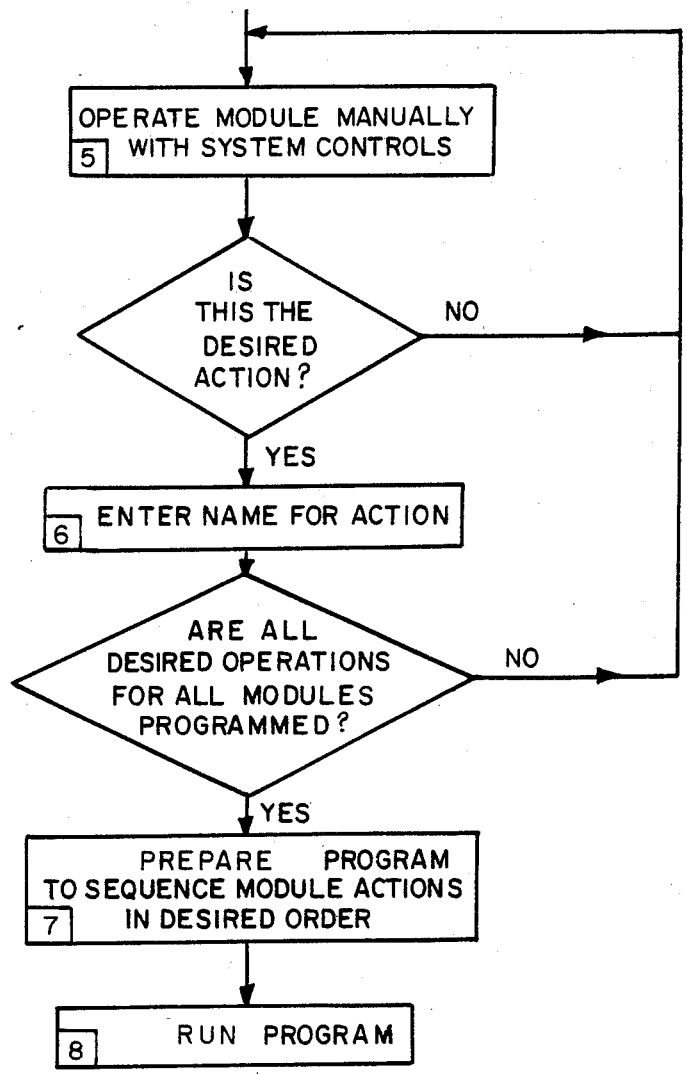
FIG. 4 is an overall schematic diagram of the control process of the invention.

Referring to FIG. 4, it is seen that the control process of the invention, comprehensively viewed, includes a step wherein the module intelligence is taught by an operator, through the system controls, a paticular operation, for example to go to a certain place and retrieve a test-tube from a rack and then to bring the test tube to another process station A. The module's memory can receive this teaching, but is is the intelligence carried by the module that will subsequently decide *how* the instruction will be carried out. Thus a robot told to go to a certain place may itself decide how it gets there by knowning where it is when the instruction is given, what obstacles are in its path, whether another earlier operation on which the test tube moving is dependent has been carried out, etc.

FIGS. 5 through 8 related to the control system as it is implemented by program code during the steps shown in FIG. 4 as 5, 6, 7, 8 respectively.

Figure 5:
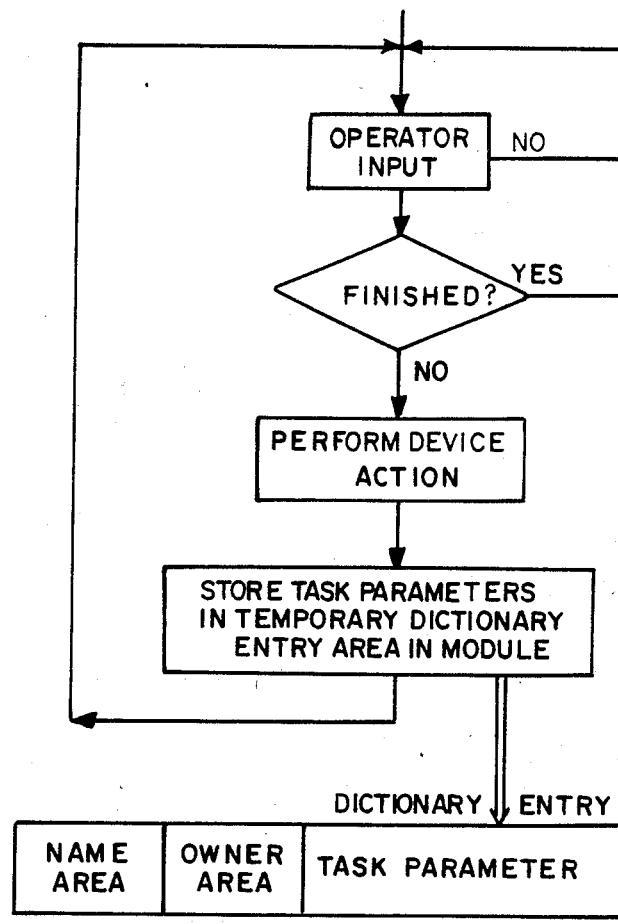
FIG. 5 is a more detailed schematic diagram of the functions associated with operation of a robotic module with the control system controls.

As seen in FIG. 5, during the teaching step the command-specific parameters for the task or "device action" are stored in a temporary dictionary entry area. The area can be in the module itself or the main system. It is often convenient to have a memory section in the main CPU which is "owned by" a specific module instead of in the module itself. The task parameters are to be one component of a Dictionary entry which defines the task, the module which is to use its intelligence in interpreting the task, and the name with which the operator chooses to tag the task parameters. This storage is shown in FIG. 6.

Figure 6:
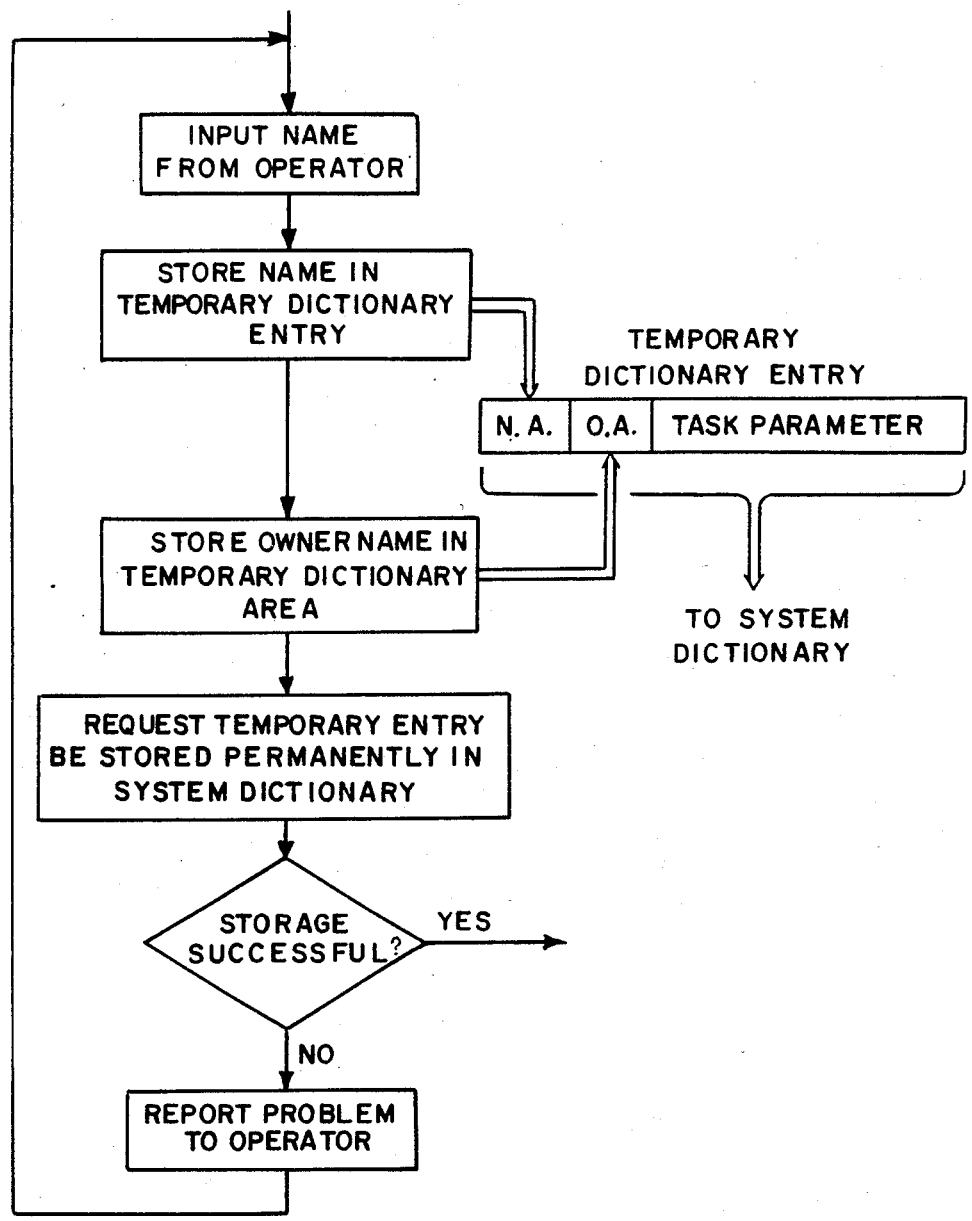
FIG. 6 illustrates the sequence of functions associated with entering a low-level "dictionary entry" for a specific action to be taken by a robot module. If the entry proves storable (no interference such as would be caused by another entry with the same name, etc.) it is "permanently stored in the System Dictionary.

FIG. 6 also illustrates that when the temporary dictionary entry is complete, the entire entry can be transferred from its temporary buffer memory section to a more permanent System Dictionary.

Figure 7:
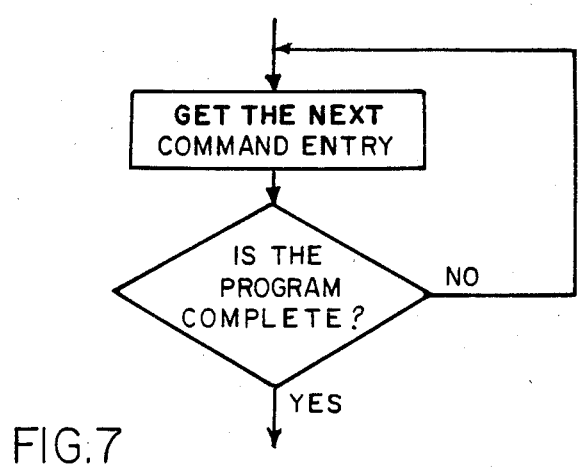
FIG. 7 is a schematic diagram illustrative of the step in preparation of a simple program means for sequencing specific action of, i.e. work-tasks of a number of robot modules.

FIG. 7 illustrates the fact that, in programming an entire sequence of module operations for the same or different modules, one will assemble a series of command entries, i.e. action names. However, it is to be noted that these command entries taken together form a very simple, operator-selected, program language that is at once highly effective and versatile.

In typical situation, the name of the action will be one having a highly specific meaning for the operation. For example, it may be "Tube-to-A". Once the storage in the System dictionary is complete, the mere call for using of the action name will cause the "Tube-to-A" action to be intelligently controlled by the code of intelligence-bearing module.

Figure 8:
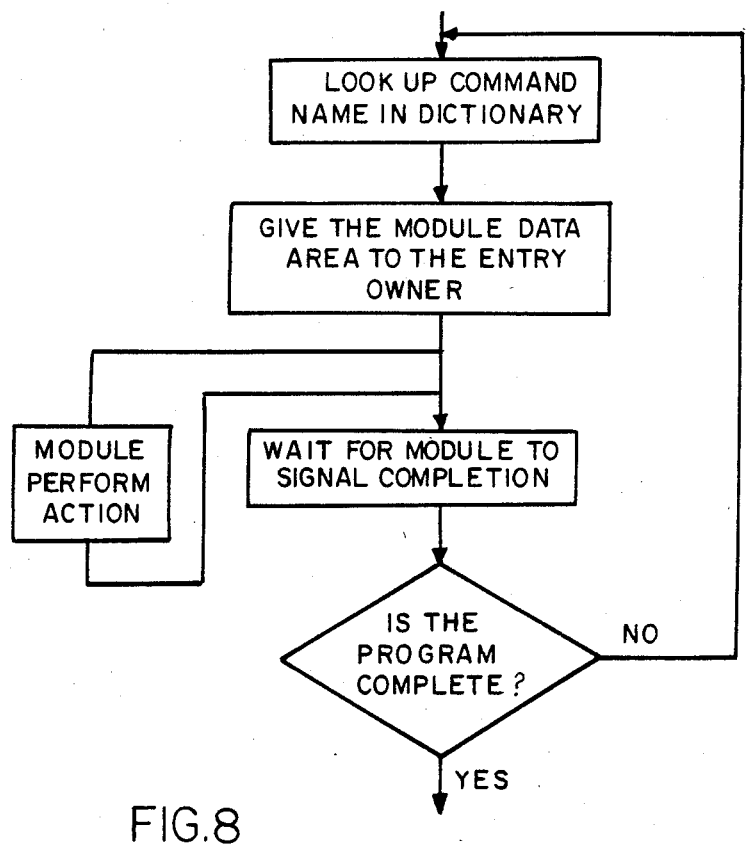
FIG. 8 is a indication of the sequence of steps in implementing the control process described in FIGS. 4 through 7.

As shown in FIG. 8, the process will function, when a specific command name is given, by selecting that name in the dictionary, selecting with it the identify of the the module owning the entry and selecting also the task-defining parameters stored as part of the dictionary entry. The module then performs whatever action has been defined for it, but does so using its own logic and intelligence. Thus if instructed to go to a certain point in space, it will, typically, chose a path that makes the best sense, i.e. the one that is shorter.

In the description of the system, it will be noted that the command-specific parameters are stored in temporary buffer memory before being committed to the dictionary. This serves an important advantage in the process described herein, because it avoids having to commit extraneous information to the permanent memory. Thus, in a simple example, when a robot position to be named "A" is established, one can put "A" in the permanent memory and the move through a series of intermediate positions to position to be named B. The intermediate position will not be placed in the memory when B is "named" for the permanent dictionary by being placed in permanent memory.

However, it should be understood that a sequence dictionary entries can also be given a single dictionary name if desired using the system of the invention. In this sense, the sequences itself can be operated as an independent module or "work station".

It is important to understand that the central processing system will, normally have no control over how the module performs its assigned task over and above the relatively simple instruction contained in the dictionary ordering that the task be undertaken.

An important aspect of the process for operating robot modules is that the simple computer language used is independent of the modules or individual robot devices. Thus a system approach is readily implemented. When a system containing several modules is run under program control, inter-module co-operation is imposed by the sequencing Control.

It is also to be realized that the system taught herein need not be utilized with a self-configuring robot of the type described in FIGS. 1-3 for particular advantages to be realized. Indeed, even in systems where the number of robotic modules were fixed absolutely, there could be very substantial advantage to utilizing the "teach-a-name" dictionary and the simple sequencing-language-moderated process aspects of the present invention.

Figure 9:
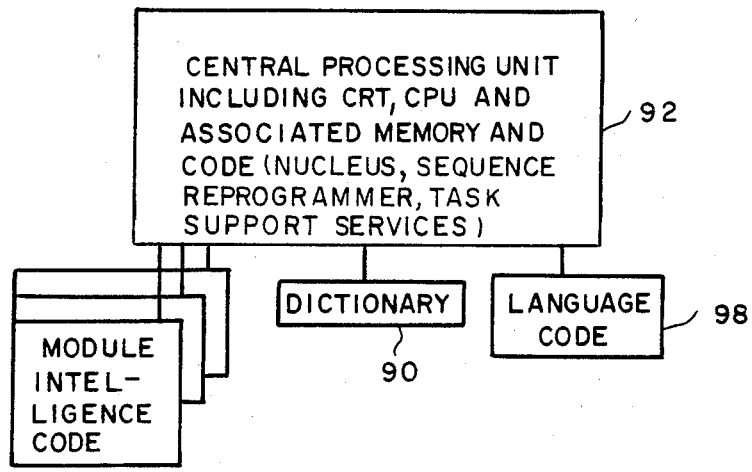
FIG. 9 is a schematic view of the architecture of a robot control system structured according to the invention.

FIG. 9 illustrates a general control system according to the invention:

It will be seen that the dictionary is managed by a sub module 90. Dictionary module 90 provides functions to enter data in the dictionary, look up entries, delete entries, update entries and to store and retrieve the dictionary on external data.

Entries in the dictionary consists of three parts including the name or tag assigned in the "teach and name" process, an indication of what robot module "owns" the entry and parameters which the robot module itself owns and can recognize as an order to perform a particular task. It is the first two parts of the dictionary entry which are defined for the whole system. The third part is defined only with respect to the module which is the "entry owner".

The dictionary 90 in the schematic of FIG. 9 is the keystone of the control system.

The Central Processing Unit 92 supports traditional operating system functions such as task, storage and control management, message passing, and resource allocation.

It includes such hardware resources as the user terminal, the user program and data storage systems, and the remote computer interface. Moreover it supports user program entry, editing, and interpretation in the Language Code 98.

It is believed that operation of these systems, with the exception of the self-configuring aspect and use of the temporary/permanent bimodal dictionary and sequencing language are carried out according to the known state of the art of digital signal processing and computer control. Many languages and specific architectures can be utilized in configuring the system. Programmers and engineers experienced in the design of computerized control systems for robots will be able to adopt the above technique to any number of specific systems suitable for their preferred language and operating requirements.

It is also to be understood that the following claims are intended to cover all of the generic and specific features of the invention herein described and all statements of the scope of the invention which might be said to fall therebetween.

What is claimed is:

1. A control system for operating a number of different robot modules, the improvement comprising a language-generating and storing means, said language generating means comprising means to receive command-specific operating parameters, from a robot module, and means to transfer said operating parameters, said known robot module identification, and a selected name for said parameters into a dictionary storage means and program means to activate such operating parameters by using said selected name as a command signal to transfer said parameters to said module.

2. A control system as defined in claim 1 wherein said system comprises a plurality of said selected names for each of a plurality of different said robot modules, at least some of which names, themselves comprise a plurality of sets of operating parameters in said dictionary means, and wherein said selected names, taken together, form a device-independent sequencing language control means for each said robot module in such system.

3. A control system as defined in claim 2 comprising:
a robotic device means;
    a first said module means for providing all of the intelligence for said robotic device means, said module means being electrically connected to said robotic device means;
computer means;
    a first physical interface means for providing a plurality of separable electrical connections between said computer means and said first module means so that all of the intelligence for the robotic device means is located on the robotic device means side of the physical interface means; means for performing a defined task;
a second and different module means for providing all of the intelligence for said defined task performing means, said module means being electrically connecting to said defined task performing means; and,
a second physical interface means for providing a plurality of separable electrical connections between said computer means and said second module means so that all of the intelligence for the defined task performing means is located on the defined task performing means side of the physical interface means.

4. A control system as defined in claim 2 comprising:
a plurality of robotic device means;
a corresponding plurality of module means with each module means providing all of the intelligence for the corresponding robotic device means, and being electrically connected thereto;
computer means; and,
a corresponding plurality of physical interface means each providing a plurality of separable electrical connections between said computer means and the corresponding module means so that all of the intelligence for each robotic device means is located on the robotic device means side of the associated physical interface means.

5. The control system of claim 2 wherein each said physical interface means provides separable electrical connections between said computer means and the corresponding module means for at least data, address and read and write.

6. The control system of claim 5 wherein each said module means further comprises means for providing a control block flag and starting offset for said computer means and means for providing an input/output interface between the computer means and the corresponding robotic device means.

7. A control system as defined in claim 1 comprising:
a robotic device means;
    a first said module means for providing all of the intelligence for said robotic device means, said module means being electrically connected to said robotic device means;
computer means;
    a first physical interface means for providing a plurality of separable electrical connections between said computer means and said first module means so that all of the intelligence for the robotic device means is located on the robotic device means side of the physical interface means;
    means for performing a defined task;
a second and different module means for providing all of the intelligence for said defined task performing means, said module means being electrically connected to said defined task performing means; and,
a second physical interface means for providing a plurality of separable electrical connections between said computer means and said second module means so that all of the intelligence for the defined task performing means is located on the defined task performing means side of the physical interface means.

8. The control system of claim 7 wherein each said physical interface means provides separable electrical connections between said computer means and said module means for at least data, address, and read and write.

9. The control system of claim 7 wherein said module means further comprises means for providing a control block flag and starting offset for said computer means and means for providing an input/output interface between the computer means and said robotic device means.

10. A self-configuring robotic system having a control system as defined in claim 1 and comprising:
   computer means having a central processing unit and an operating system that contains at least a nucleus, a sequence reprogrammer and task support services;
   a plurality of different robotic device means;
   a corresponding plurality of module means with each module means providing all of the intelligence for the corresponding robotic device means and being electrically connected thereto, each said module means having means for providing a control block flag and starting offset for said computer means and means for providing an input/output interface between the computer means and the corresponding robotic device means; and,
   a corresponding plurality of physical interface means each providing a plurality of separable electrical connections between said computer means and the corresponding module means so that all of the intelligence for each robotic device means is located on the robotic device means side of the associated physical interface means.

11. A self-configuring robotic system having a control system as defined in claim 1 wherein:
   said computer means having a central processing unit and an operating system that contains at least a nucleus, a sequence reprogrammer and task support services;
   and wherein a robotic device means having;
   a first module means providing all of the intelligence for said robotic device means and being electrically connected thereto, said first module means having means for providing a control block flag and starting offset for said computer means and means for providing an input/output interface between the computer means and said robotic device means;
   a first physical interface means for providing a plurality of separable electrical connections between said computer means and said first module means so that all of the intelligence for the robotic device means is located on the robotic device means side of the physical interface means;
   means for performing a defined task;
   a second different module means providing all of the intelligence for said defined task performing means and being electrically connected thereto, said second module means having means for providing a control block flag and starting offset for said computer means and means for providing an input/output interface between the computer means and said defined task performing means;
   a second physical interface means for providing a plurality of separable electrical connections between said computer means and said second module means so that all of the intelligence for the defined task performing means is located on the defined task performing means side of the physical interface means.

12. A method for self-configuring a robotic system that comprises:
   the system of claim 1;
   a robotic device means;
      a first module means for providing all of the intelligence for said robotic device means, said module means being electrically connected to said robotic device means;
   computer means having a central processing unit and an operating system that contains at least a nucleus, a sequence reprogrammer and task support services;
      a first physical interface means for providing a plurality of separable electrical connections between said computer means and said first module means so that all of the intelligence for the robotic device means is located on the robotic device means side of the physical interface means;
   a task device means for performing a defined task;
      a second module means for providing all of the intelligence for said defined task performing device means, said second module means being electrically connected to said defined task performing device means; and,
      a second physical interface means for providing a plurality of separable electrical connections between said computer means and said second module means so that all of the intelligence for the defined task performing device means is located on the defined task performing device means side of the physical interface means;
   said method comprising the steps of:
      1. searching for and finding the control block flag in one of the module means;
      2. creating an intialization task in response to finding the control block flag in said one of the module means;
      3. starting said initialization task;
      4. initializing the associated device means from the intelligence contained in said one module means; and,
      5. repeating steps 1 through 4 for the other module means and its associated device means.

13. A method for self-configuring a robotic system that comprises:
   the system of claim 1;
   a plurality of different robotic device means;
   a corresponding plurality of module means with each module means providing all of the intelligence for the corresponding robotic device means, and being electrically connected thereto;
   computer means having a central processing unit and an operating system that contains at least a nucleus, a sequence reprogrammer and task support services; and,
   a corresponding plurality of physical interface means each providing a plurality of separable electrical connections between said computer means and the corresponding module means so that all of the intelligence for each robotic device means is located on the robotic means side of the associated physical interface means said method comprising the steps of:
      1. searching for and finding the control block flag in one of the module means;

2. creating an initialization task in response to finding the control block flag in said one of the module means;
3. starting said initialization task;
4. initializing the associated robotic device means from the intelligence contained in said one module means; and,
5. repeating steps 1 through 4 for each one of the other robotic device means until the plurality of robotic device means has been initialized.

* * * * *

UNITED STATES PATENT AND TRADEMARK OFFICE
CERTIFICATE OF CORRECTION

PATENT NO. : 4,586,151

DATED : April 29, 1986

INVENTOR(S) : William J. Buote

It is certified that error appears in the above-identified patent and that said Letters Patent is hereby corrected as shown below:

Column 8, line 31, "The control system of Claim 2" should read -- The control system of Claim 4 --.

Signed and Sealed this

Twelfth Day of August 1986

[SEAL]

Attest:

DONALD J. QUIGG

Attesting Officer

Commissioner of Patents and Trademarks